United States Patent [19]
Linford

[11] Patent Number: 6,132,801
[45] Date of Patent: Oct. 17, 2000

[54] PRODUCING COATED PARTICLES BY GRINDING IN THE PRESENCE OF REACTIVE SPECIES

[75] Inventor: Matthew R. Linford, Sommerville, N.J.

[73] Assignee: The Board of Trustees of the Leland Stanford Junior University, Palo Alto, Calif.

[21] Appl. No.: 09/032,356

[22] Filed: Feb. 27, 1998

Related U.S. Application Data

[60] Provisional application No. 60/039,229, Feb. 28, 1997.

[51] Int. Cl.[7] .................................................... B05D 7/00
[52] U.S. Cl. ........................ 427/221; 427/212; 427/215; 427/220; 241/15
[58] Field of Search .................................... 427/212, 215, 427/220, 221, 242; 502/85, 105, 151, 158, 232; 241/15, 16, 27, 26

[56] References Cited

U.S. PATENT DOCUMENTS

| | | |
|---|---|---|
| 3,802,909 | 4/1974 | Rockett et al. ........................ 117/54 |
| 4,093,771 | 6/1978 | Goldstein et al. ...................... 427/215 |
| 4,191,587 | 3/1980 | Kratel et al. .......................... 427/220 |
| 4,781,940 | 11/1988 | Denton, Jr. ............................ 427/221 |
| 4,895,889 | 1/1990 | Semen et al. .......................... 427/220 |
| 4,902,570 | 2/1990 | Heinemann et al. ................... 427/220 |
| 5,096,733 | 3/1992 | Vallyathan et al. .................... 427/220 |

*Primary Examiner*—Shrive Beck
*Assistant Examiner*—Paul D. Strain
*Attorney, Agent, or Firm*—Lumen Intellectual Property Services

[57] ABSTRACT

Microparticles including an organic coating covalently bound to an inorganic substrate are produced in one step by grinding the substrate while immersed in a reactive coating agent. Preferably, a silicon substrate is ground in the presence of an alkene to generate alkyl-coated silicon particles. The particle coatings are robustly attached to the particle cores through Si—C bonds. Various solids such as semiconductors can be used as substrates. The coatings can include various organic radicals, halogen atoms, or hydrogen. The particles can be used as stationary phases for chromatography, as substrates for biological assays, as polymer additives, or as catalyst supports.

53 Claims, 3 Drawing Sheets

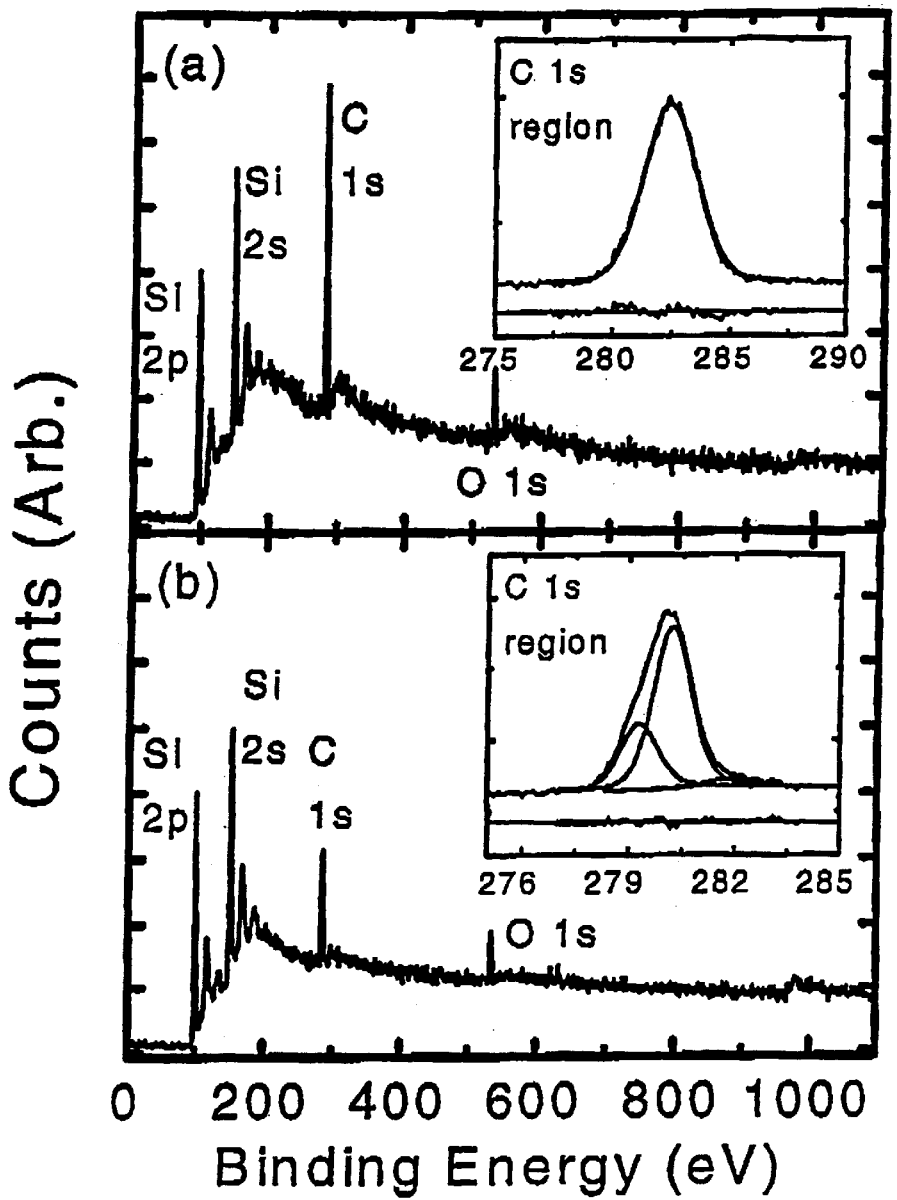
FIG. 4-A
FIG. 4-B

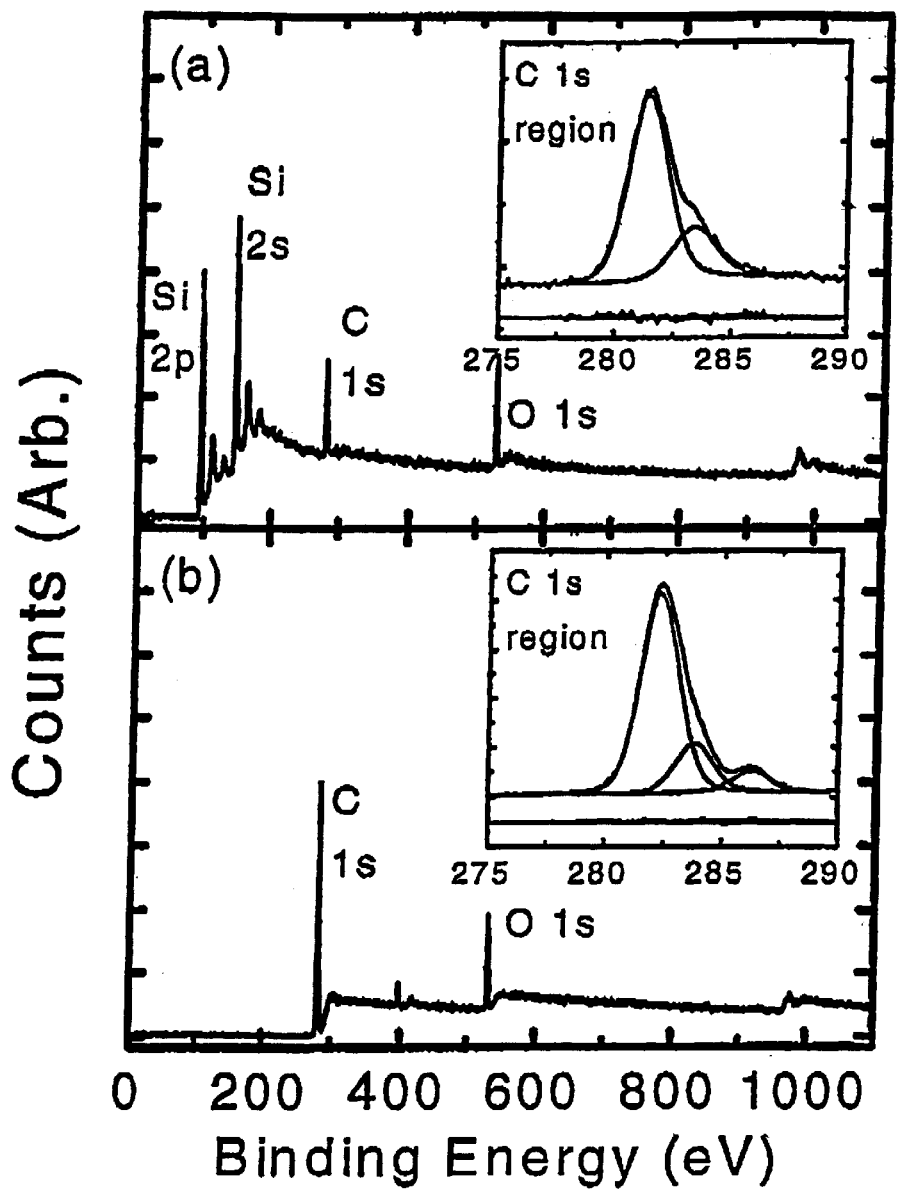
FIG. 5-A
FIG. 5-B

PRODUCING COATED PARTICLES BY GRINDING IN THE PRESENCE OF REACTIVE SPECIES

RELATED APPLICATION DATA

This application is based on U.S. Provisional patent application Ser. No. 60/039,229, filed Feb. 28, 1997, which is herein incorporated by reference.

FIELD OF THE INVENTION

The present invention relates to a method of manufacturing particles comprising an organic coating covalently bonded to a covalent substrate.

BACKGROUND OF THE INVENTION

Microparticles are used in a wide variety of applications and substances, including as stationary phases for chromatography, as catalyst supports, as additives for improving the mechanical properties of polymers, as substrates in biological assays, and as pigments in paints. For many such applications the particles include coatings for providing desired chemical functionality or physical properties to the particle surface, and/or protecting the particle substrate from outside reagents. As an example, hydrocarbon-coated silica microparticles are used in reverse-phase chromatography to separate substances of interest according to their affinity for the particles.

It is often desirable to ensure that the coating is robustly attached to the particle substrate. For example, in chromatography applications, it is desirable that the coating attachment be chemically insensitive to the eluted reagents. In microparticle/polymer composites, robust coating attachments can ensure the preservation of desired adhesion of the microparticles to the polymers. Covalent bonding of the coating to the substrate generally allows a more robust coating attachment than other bonding mechanisms such as surface adsorption or ionic bonding.

Covalently bonding a coating to a surface can be performed by reacting particles of the substrate material with various coating agents. Such reactions may require the use of specialized compounds and processes, and may not yield chemically robust bonds. In addition, such reactions may make the manufacturing process relatively expensive and/or incompatible with functional groups desired on the particle surface. For example, reverse phase silica gel particles can be generated by coating fine, clean sand (silica gel) with a hydrocarbon layer. The coating process may require the use of multiple reagents and reaction steps for attaching the hydrocarbon layer to the silica gel. In addition, some covalent coating attachments (e.g. through silicon-oxygen-silicon bonds) can be relatively sensitive to hydrolysis or other chemical reactions.

OBJECTS AND ADVANTAGES OF THE INVENTION

Accordingly, it is a primary object of the present invention to provide a relatively simple method of manufacturing particles including a coating robustly attached to a particle substrate through covalent bonds. It is another object to provide a simple method of producing chemically and physically robust attachment of an organic coating to a covalent substrate through covalent bonds. It is yet another object to provide a method which does not require multiple reagents or reaction steps for generating covalently coated particles. It is another object to provide a method in which particle formation and coating are performed simultaneously, in a single step. It is yet another object to provide a method of producing particles having a semiconductor substrate such as silicon covalently bonded to an organic coating. It is yet another object to provide a method of producing particles including an organic coating covalently bonded to a silicon-containing substrate through silicon-carbon bonds. It is yet another object to provide a method of producing particles including a silicon substrate covalently coated by halogen atoms.

SUMMARY OF THE INVENTION

A method of the present invention comprises providing a covalent solid substrate and a coating agent, grinding the substrate in the presence of the coating agent to form covalently coated particles, and isolating the particles. Grinding the substrate serves to fracture the substrate into particles, and to activate substrate atoms along fracture surfaces for reaction with atoms of the coating agent. The activated substrate atoms react with the coating agent to form covalent bonds linking the particle cores to the particle coatings. The particle cores are formed from the substrate, while the particle coatings are formed from the coating agent.

In a preferred embodiment, the substrate is silicon and the coating agent is an organic unsaturated compound such as an alkene. The fracturing process produces silicon radicals at the fracture surfaces. The silicon radicals can react with carbon atoms at a site of unsaturation of the coating agent, to form covalent, relatively robust carbon-silicon bonds. In alternative embodiments, halogenating or hydrogenating coating agents are used.

DESCRIPTION OF THE FIGURES

FIG. 4-A shows an XPS spectrum of particles generated by grinding a silicon wafer in the presence of 1-octadecene, according to the present invention.

FIG. 4-B shows an XPS spectrum of particles generated by grinding a silicon wafer in the presence of 1-pentene, according to the present invention.

FIG. 5-A shows a control XPS spectrum of particles generated by grinding a silicon wafer in the presence of 1-octadecene.

FIG. 5-B shows a control XPS spectrum of an adhesive tape similar to that used to hold the particles characterized by the spectra of FIGS. 4-A and 4-B.

DETAILED DESCRIPTION

In the following discussion, the term "coating agent" is understood to refer to a material that is not covalently bonded to a particle substrate, for example a material that is pure or in solution prior to its covalent bonding to the substrate. The term "coating" refers to a coating containing atoms of the coating agent, as covalently bonded to a particle substrate. A coating is derived from a coating agent by covalent bonding of atoms of the coating agent to atoms of the substrate, optionally followed by other processing steps. For example, a coating may include a polymer covalently bonded to a particle substrate, generated by covalent bonding of a monomer (coating agent) to the substrate, followed by polymerization of the monomer.

Figure 1:
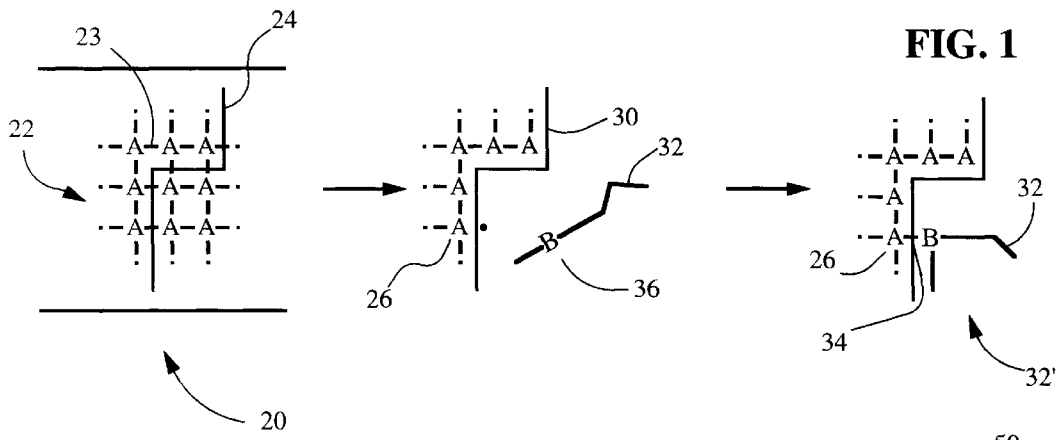
FIG. 1 shows a schematic microscopic view of a covalent solid substrate during and after processing according to a method of the present invention.

In the present invention, particle formation and coating are achieved in a single step by grinding a substrate in the presence of a reactive coating agent. FIG. 1 shows a schematic microscopic view of a substrate and covalently attached coating during and after processing steps according to the present invention. A covalent solid substrate 20 is formed of atoms 22 (A) linked by covalent bonds 23. As substrate 20 is ground, a microscopic fracture 24 forms within substrate 20, exposing a fracture surface 30. The fracturing process results in the activation of substrate atoms along fracture surface 30.

Activated atoms include radicals, cations, and anions. For example, an atom 26 in an activated (e.g. radical) state reacts with a coating agent molecule 32, leading to the formation of a covalent bond 34 between atom 26 and a reactive atom 36 (B) of molecule 32. In bound form, molecule 32 becomes part of a coating 32' covalently bound to substrate 20. Atom 26 is part of the core of the coated particle comprising coating 32'.

Substrate 20 must generally contain atoms capable, upon activation, of reacting with moieties of the coating agent to form covalent bonds. Substrate 20 is preferably crystalline silicon. Silicon of very high purity is readily available at relatively low cost. Silicon can be readily ground into particles of very fine sizes, e.g. on the order of 0.1–1 $\mu$m in diameter. Moreover, silicon makes chemically and physically robust covalent bonds with carbon. Other potentially suitable substrates include semiconductor substrates such as germanium and silicon nitride. Semiconductors with relatively high bandgaps may be desirable for making particles with specific optical properties, for example transparent particles. Glass substrates can also be used, as well as substrates made of a solid polymer below its glass transition temperature.

The coating agent is preferably a pure reactive liquid. The coating agent can also include solids or gases, and can include mixtures of compounds. The coating agent used is preferably an unsaturated organic compound such as an alkene, having the formula $R_1(R_2)C=C(R_3)R_4$, where of $R_1$, $R_2$, $R_3$, and $R_4$ can be hydrogen or substituted or unsubstituted organic radicals. Alkenes are relatively inexpensive and react readily with silicon radicals to form covalent bonds between silicon atoms and carbon atoms at sites of unsaturation of the alkenes. If the radicals $R_n$ (n=1 . . . 4) are hydrogen or unsubstituted alkyl radicals, the resulting particles are coated with relatively hydrophobic unsubstituted alkyl chains. Such hydrophobic coatings can be particularly useful in applications such as reverse phase chromatography, in which charged species at the particle surface are undesirable.

Figure 2:
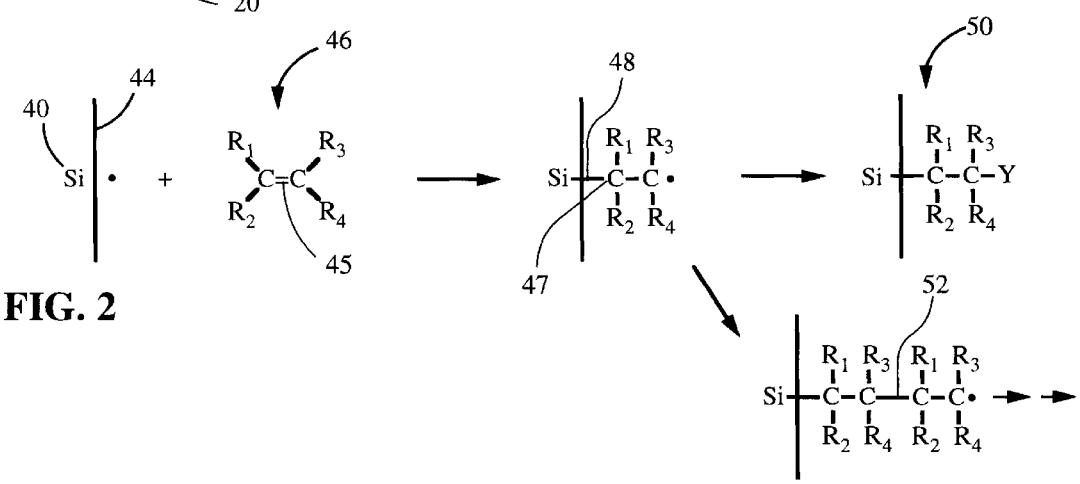
FIG. 2 illustrates schematically a reaction of a surface silicon radical with an alkene, according to a preferred embodiment of the present invention.

FIG. 2 illustrates schematically the reaction between a silicon radical 40 formed at a fracture surface 44, and a molecule 46 of an unsaturated organic coating agent. Since radical 40 can react with molecular oxygen from ambient air, the coating agent is preferably de-aired before the grinding step, in order to reduce the concentration of oxygen dissolved in the coating agent. Molecule 46 comprises a double bond 45, which defines a position of unsaturation of molecule 46. During the grinding step, molecule 46 reacts with radical 40 to form a covalent bond 48 between atom 40 and a carbon atom 47 initially participating in double bond 47. The resulting radical can abstract a moiety Y (e.g. hydrogen) from other present molecules, to generate a coating molecule 50 covalently bound to atom 40. The resulting radical can also react with a carbon atom at a position of unsaturation of another coating agent molecule, generating a polymer radical 52. Radical 52 can in turn react with other molecules.

In general, various coating agents may be suitable for use in a method of the present invention. The chemistry of silicon and other inorganic radicals is generally well known, and will not be treated here in detail. For information on silicon radical chemistry see for example Kochi, *Free Radicals,* John Wiley, New York (1973), Kanabus-Kaminscha et al., *J. Am. Chem. Soc.* 109:5267–5268 (1987), Chatgilialoglu, *Accounts of Chem. Res.* 25:188–194 (1992), Chatgilialoglu, *Chem. Reviews* 95:1229–1251 (1995), and U.S. Pat. No. 5,429,708. Potentially suitable coating agents include substituted or unsubstituted unsaturated organic compounds having carbon-carbon, carbon-oxygen, or carbon-nitrogen double or triple bonds. Examples of such unsaturated coating agents include alkynes ($R_1C\equiv CR_2$), carbonyl compounds ($R_1C(O)R_2$) such as aldehydes, ketones, carboxylic acids, esters, carbazides, and amides, Schiff bases ($R_1(R_2)C=NR_3$), and nitriles ($RC\equiv N$), where R and $R_n$ (n=1 . . . 3) are hydrogen or substituted or unsubstituted organic radicals. The carbon atom initially involved in a double or triple bond can react with a substrate radical to form a covalent bond. The coating agent can also be a halide (R—X) such as an alkyl halide, where X is a halogen such as Cl, Br, or I, and R is a substituted or unsubstituted organic radical. Silicon radicals may then react with either of the radical and halogen, yielding Si—R and Si—X covalent bonds.

Other coating agents can be used for generating halogen-coated Si particles. Such agents include halogenating compounds such as $Cl_2$, $Br_2I_2$, $SO_2Cl_2$, BrCl, ICl, iodobenzenedichloride, t-butyl hypochlorite, trichloromethanesulfonyl chloride, N-chlorodialkylamine, N-bromo-dialkylamine, phosphorus pentachloride, or bromotrichloromethane. Reaction of Si radicals with the halogenating compounds leads to formation of Si-halogen covalent bonds. A hydrogenating coating agent can be used to generate hydrogen-terminated Si particles according to a method of the present invention. Hydrogenating agents include tris-trimethylsilylsilane, as well as molecular hydrogen in the presence of a metallic catalyst. Reaction of Si radicals with the hydrogenating compounds leads to formation of Si—H covalent bonds. Halogenating and hydrogenating compounds are generally well known. For information on halogenating agents see Potusma, M. L., in *Free Radicals* (Kochi, ed.), p. 159–229, John Wiley, New York (1973). For information on hydrogenating agents see for example the above-referenced article by Kanabus-Kaminscha et al., *J. Am. Chem. Soc.* 109:5267–5268 (1987).

Figure 3:
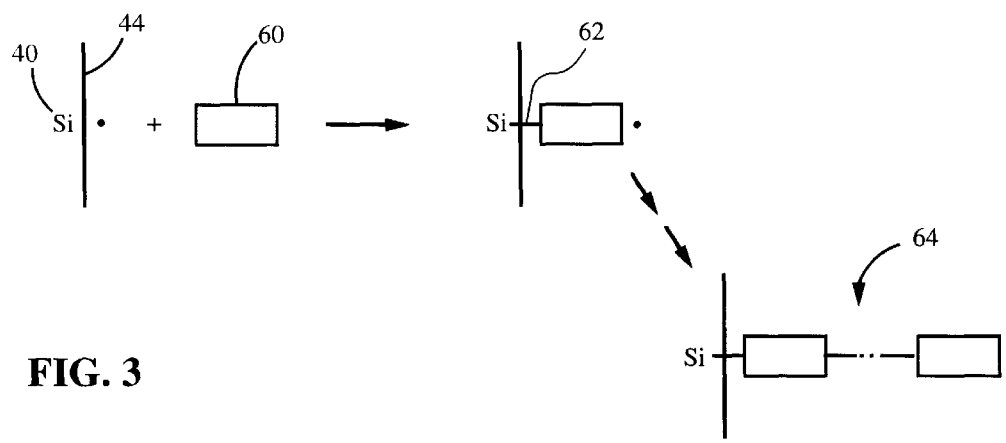
FIG. 3 illustrates schematically a reaction of a surface Si radical with a monomer followed by polymerization, to generate a polymer-coated particle according to the present invention.

Other suitable coating agents include monomers capable of polymerization into polymers. FIG. 3 illustrates schematically a reaction of a monomer 60 with a silicon radical 40 to form a covalent bond 62 between monomer 60 and atom 40. Following a series of polymerization steps, a polymer 64 is generated. Polymer 64 is covalently bound to atom 40, and forms part of the coating of the particle containing atom 40. Various monomers/polymers are well known in the art. Examples of suitable monomers include styrene, vinyl chloride, vinylidene fluoride, tetrafluoroethylene, acrylic acid, butadiene, isoprene, dimethyldiallylammonium chloride, sodium styrene sulfonate, ethylene imine, vinylidene chloride, divinyl benzene, acrylonitrile, and (meth)acrylic esters such as methacrylic acid and methyl methacrylate.

Polymer-coated Si particles of the present invention can be particularly useful as additives for organic materials such as plastics or other polymers. The coated Si particles are embedded in an organic material of interest, generating a composite with improved mechanical properties. The coating acts as a coupling agent between the silicon and the material of interest, reducing de-bonding of the particles from the material of interest. Block-copolymer particles can be generated by grinding a polymer substrate in the presence of a coating agent comprising monomers distinct from those forming the substrate polymer.

A method of the present invention is also useful for producing coated particles having desired surface functional groups. A functional group of interest can be attached to the particle substrate during the grinding step, by providing a coating agent including the functional group of interest and a functional group for attachment to the substrate. The functional group of interest may be chosen such that it does not interfere with the covalent bonding of the coating agent to the substrate. Compatibility considerations for reactions between polyfunctional compounds and free radicals are generally well known, and will not be discussed here in detail. For information on such considerations see for example Linford et al., *J. Am. Chem. Soc.* 117(11) :3145–3155 (1995). The functional group of interest may also be linked to the particle coating in a distinct reaction after the grinding/coating attachment step. Functional groups desirable for various applications are well known. Potentially suitable functional groups include amino, carboxy, aromatic, polyaromatic, nitrile, amide, aromatic amine, ester, alcohol, phenol, thiol, imidazole, poly (ethyleneglycol), azide, hydrazide, carbazide, hydrazine, sulfide, disulfide, aldehyde, sulfonate, phosphonate, alkyl halide, protein, nucleic acid, sugar, avidin, and biotin groups.

EXAMPLE

The following example is intended to illustrate aspects of a particular implementation of the invention, and should not be construed to limit the invention. A method of the present invention was used to generate alkyl-coated silicon particles, which were then characterized by X-ray photoelectron spectroscopy (XPS).

In a first experiment, a piece of clean silicon wafer was immersed using a long chain 1-alkene, 1-octadecene ($CH_3(CH_2)_{15}CH=CH_2$), as a coating agent. The octadecene was degassed prior to grinding to remove oxygen molecules present in the liquid, since oxygen reacts with silicon radicals. The piece was ground to a fine powder, using a mortar and pestle in an inert (Ar) atmosphere in a glove box. After grinding, the resulting coated silicon particles were removed to air and separated from the octadecene by centrifugation; and then washed using isopropanol. The isopropanol-particle mixture was mechanically agitated during washing, and the particles were separated from the isopropanol by centrifugation. After repeating the washing cycles eight times, the isopropanol was pumped off, leaving clean octadecene-coated silicon particles. The particles were adhered to an adhesive tape, and XPS measurements were performed.

FIG. 4-A shows an XPS spectrum of the resulting microparticles. The spectrum exhibits expected silicon 2p and 2s peaks, and a strong peak due to carbon. The carbon signal was similar in intensity to signals measured from densely-packed monolayers of long hydrocarbon chains on a macroscopic silicon surface, suggesting that the particles were coated by a monolayer of alkyl chains. An oxygen peak was also present, indicating that some oxygen was present at the particle surfaces. The observed oxygen may be due to reactions between silicon radicals and oxygen molecules contacting the sample after coating.

In a second experiment, a piece of clean silicon wafer was ground while immersed in a short-chain 1-alkene, 1-pentene ($CH_3(CH_2)_2CH=CH_2$). The grinding and isolation steps were similar to those performed for 1-octadecene. FIG. 4-B shows an XPS spectrum of the resulting coated particles. The carbon peak was less intense than that observed for 1-octadecene. The inset of FIG. 4-B shows a narrow carbon is scan at high resolution. The spectrum was composed of two peaks, the smaller of which was shifted to lower energy. Since oxygen is more electronegative than carbon, a shift due to carbon bonding to oxygen would be expected to be to a higher energy. Silicon is more electropositive than carbon, and thus a shift due to carbon bonding to silicon would be expected to be at a lower energy, as observed. Since silicon, carbon, and oxygen are the only atoms present at the particle surface, the shoulder observed at lower binding energy in the narrow scan of FIG. 4-B is direct evidence for a carbon-silicon bond between the alkyl chains of the coating and the silicon atoms in the particle substrate.

A control experiment was performed to confirm that the carbon-carbon double bonds of the alkenes were responsible for binding to the silicon substrate. A piece of silicon wafer was ground in a long chain hydrocarbon, hexadecane ($CH_3(CH_2)_{14}CH_3$), which does not contain a double bond. The grinding and isolation steps were similar to those described above. FIG. 5-A shows an XPS spectrum of the resulting particles. As illustrated, the spectrum shows significantly less carbon than the spectrum of FIG. 4-A. The high resolution carbon is scan in the inset shows two peaks, the smaller of which is shifted to higher energy. As discussed above, the energy shift is due to carbon bonding to oxygen. The observed oxygen may be due to reactions between silicon radicals and oxygen molecules contacting the sample after coating, or to reactions between isopropanol and surface Si—OH groups.

Another control experiment was performed to confirm that the measured spectra were indicative of properties of the particles, rather than the adhesive tape the particles adhered to. FIG. 5-B shows an XPS spectrum of the adhesive tape. Only carbon, oxygen, and nitrogen (400 eV) were detected. Moreover, the high-resolution carbon 1s scan is very different from the scans shown in FIGS. 4-A and 4-B. The data of FIG. 5-B indicates that the spectra shown in FIG. 4-A and 4-B are due to the analyzed particles.

The preceding description illustrates by way of example particular embodiments of the present invention. It will be clear to one skilled in the art that the above embodiments may be altered in many ways without departing from the scope of the invention. For example, as is apparent to the skilled artisan, various grinding/fracturing methods can be suitable in a method of the present invention. The coating agent may include a solid which is ground together with the substrate, or a gas dissolved in an inert solvent. De-airing of the coating agent may not be required prior to the grinding step. The reaction between the substrate and the coating agent need not proceed through a radical mechanism. A single coating agent molecule may bond to more than one substrate atom. For example, two carbon atoms involved in a double or triple bond in the coating agent may each bond adjacent Si atoms of the substrate. Particles can be ground to various sizes, and may be sized after or during isolation. Various particle isolation techniques can be used, including sedimentation, filtering, or simple evaporation of excess coating agent. Accordingly, the scope of the invention should be determined by the following claims and their legal equivalents.

What is claimed is:

1. A method of generating covalently coated particles, comprising the steps of:
   a) providing a solid substrate containing silicon atoms;
   b) providing an organic coating agent having carbon atoms wherein the coating agent includes at least one carbon triple bond, at least one carbon double bond, or at least one halogen atom; and
   c) generating said covalently coated particles by grinding said substrate in a presence of said coating agent to fracture said substrate and to activate said silicon atoms at fracture surfaces of said substrate such that covalent bonds are formed between said carbon atoms and said silicon atoms.

2. The method of claim 1 wherein said coating agent comprises an alkene.

3. The method of claim 2 wherein said alkene is a 1-alkene.

4. The method of claim 1 wherein:
   a) said coating agent has the formula $R_1(R_2)C=C(R_3)R_4$ or $R_1C\equiv CR_2$; and
   b) each of $R_1$, $R_2$, $R_3$, and $R_4$ is selected from the group consisting of hydrogen and organic radicals.

5. The method of claim 1 wherein said coating agent comprises an alkyne or a nitrile.

6. The method of claim 1 wherein:
   a) said coating agent has the formula $R_1C\equiv CR_2$; and
   b) each of $R_1$ and $R_2$ is selected from the group consisting of hydrogen and organic radicals.

7. The method of claim 1 wherein said coating agent comprises an alkyl halide.

8. The method of claim 1 wherein:
   a) said coating agent has the formula R—X; and
   b) X is a halogen, and R is an organic radical.

9. The method of claim 1 wherein:
   a) said coating agent comprises monomers capable of polymerization into a polymer; and
   b) said method further comprising a step of polymerizing said monomers such that said particles are covalently coated by said polymer.

10. The method of claim 1 wherein said covalently-coated particles contain a surface functional group selected from the group consisting of amino and carboxy groups.

11. The method of claim 1 wherein said covalently-coated particles contain a surface functional group selected from the group consisting of aromatic, polyaromatic, nitrile, amide, aromatic amine, ester, alcohol, phenol, thiol, imidazole, poly(ethyleneglycol), azide, hydrazide, carbazide, hydrazine, sulfide, disulfide, aldehyde, sulfonate, phosphonate, alkyl halide, protein, nucleic acid, sugar, avidin, and biotin groups.

12. The method of claim 1 further comprising a step of de-airing said coating agent prior to said step of grinding said substrate, for reducing an oxygen concentration in said coating agent.

13. The method of claim 1 wherein said step of isolating said particles comprises a step of washing said particles, for separating said particles from excess unbound coating agent.

14. A method of generating coated particles, comprising the steps of:
   a) providing an organic coating agent comprising carbon atoms, wherein the coating agent includes at least one carbon triple bond, at least one carbon double bond, or at least one halogen atom;
   b) providing a covalent solid substrate comprising silicon atoms;
   c) grinding said substrate in a presence of said coating agent, for generating covalently coated particles comprising covalent bonds between carbon atoms of said coating agent and silicon atoms of said substrate; and
   d) isolating said covalently coated particles.

15. A method of generating covalently coated particles, comprising the steps of:
   a) grinding a silicon containing solid substrate in the presence of an organic coating agent having at least one carbon double bond, at least one carbon triple bond or at least one halogen atom, such that said coating agent bonds to said substrate to form organic coatings covalently bonded to particle cores formed of said substrate, said covalently coated particles being formed by said coatings bound to said cores; and
   b) isolating said covalently coated particles.

16. A method of generating particles covalently coated by a polymer, comprising the steps of:
   a) providing a covalent solid substrate containing silicon atoms;
   b) providing a coating agent comprising a monomer capable of polymerization into said polymer;
   c) grinding said substrate in a presence of said coating agent, to activate said silicon atoms at fracture surfaces of said substrate for forming covalent bonds between said silicon atoms and atoms of said monomer; and
   d) initiating a polymerization of said monomer to generate said particles covalently coated by said polymer.

17. The method of claim 16 wherein said monomer is selected from the group consisting of styrene, vinyl chloride, vinylidene fluoride, tetrafluoroethylene, acrylic acid, methacrylic acid, methyl methacrylate, dimethyldiallylammonium chloride, butadiene, and isoprene.

18. The method of claim 16 wherein said monomer is selected from the croup consisting of sodium styrene sulfonate, ethylene imine, vinylidene chloride, divinyl benzene, acrylic ester, methacrylic ester, and acrylonitrile.

19. A method of generating covalently coated particles, comprising the steps of:
   a) providing an organic coating agent having at least one carbon double bond, at least one carbon triple bond or at least one halogen atom;
   b) providing a covalent solid substrate; and
   c) fracturing said substrate in a presence of said coating agent, to activate substrate atoms along fracture surfaces of said substrate for forming covalent bonds between atoms of said coating agent and said substrate atoms along said fracture surfaces, to generate particles of said substrate covalently bound to an organic coating formed from said coating agent.

20. The method of claim 19 wherein said substrate comprises a semiconductor.

21. The method of claim 20 wherein said semiconductor is silicon.

22. The method of claim 20 wherein said semiconductor is germanium.

23. The method of claim 20 wherein said semiconductor is silicon nitride.

24. The method of claim 19 wherein said substrate comprises a glass.

25. The method of claim 19 wherein said substrate comprises a polymer.

26. A method of generating halogen-coated particles, comprising the steps of:
   a) providing a halogenating coating agent;
   b) providing a silicon substrate; and
   c) grinding said substrate in a presence of said coating agent, to activate silicon substrate atoms along fracture surfaces of said substrate for forming covalent bonds between halogen atoms of said coating agent and said substrate atoms along said fracture surfaces, to generate halogen-coated particles of said substrate.

27. The method of claim 26 wherein said coating agent is selected from the group consisting of $Cl_2$, $Br_2$, $I_2$, $SO_2Cl_2$, BrCl, ICl, iodobenzenedichloride, t-butyl hypochlorite, trichloromethanesulfonyl chloride, N-chloro-dialkylamine, N-bromo-dialkylamine, phosphorus pentachloride, and bromotrichloromethane.

28. The method of claim 26 wherein said coating agent comprises an alkyl halide.

29. A method of generating hydrogen-coated particles, comprising the steps of:
   a) providing a hydrogenating coating agent;
   b) providing a silicon substrate;
   c) grinding said substrate in a presence of said coating agent, to activate silicon substrate atoms along fracture surfaces of said substrate for forming covalent bonds between hydrogen atoms of said coating agent and said substrate atoms along said fracture surfaces, to generate hydrogen-coated particles of said substrate.

30. The method of claim 29 wherein said hydrogenating agent comprises tris-trimethylsilylsilane.

31. The method of claim 29 wherein said hydrogenating agent comprises molecular hydrogen.

32. The method of claim 1 wherein the substrate comprises silica or a glass.

33. The method of claim 1 further comprising
   d) isolating said covalently coated particles.

34. The method of claim 9 wherein the polymerization is initiated at the surface of the particle by reactive species created by said grinding.

35. The method of claim 16 further comprising:
   e) isolating said covalently coated particles.

36. The method of claim 19 further comprising:
   d) isolating said covalently coated particles.

37. The method of claim 26 further comprising:
   d) isolating said halogen-coated particles.

38. The method of claim 29 further comprising
   d) isolating said hydrogen-coated particles.

39. The method of claim 29 wherein the substrate is ground in the presence of a catalyst.

40. The method of claim 39 wherein the catalyst is a metal catalyst.

41. The method of claim 19 wherein said coating agent comprises an alkene.

42. The method of claim 41 wherein said alkene is a 1-alkene.

43. The method of claim 19 wherein:
   a) said coating agent has the formula $R_1(R_2C\!=\!C(R_3)R_4$ or $R_1C\!\equiv\!CR_2$; and
   b) each of $R_1$, $R_2$, $R_3$, and $R_4$ is selected from the group consisting of hydrogen and organic radicals.

44. The method of claim 19 wherein said coating agent comprises an alkyne or a nitrile.

45. The method of claim 19 wherein:
   a) said coating agent has the formula $R_1C\!\equiv\!CR_2$; and
   b) each of $R_1$ and $R_2$ is selected from the group consisting of hydrogen and organic radicals.

46. The method of claim 19 wherein said coating agent comprises an alkyl halide.

47. The method of claim 19 wherein:
   a) said coating agent has the formula R—X; and
   b) X is a halogen, and R is an organic radical.

48. The method of claim 19 wherein:
   a) said coating agent comprises monomers capable of polymerization into a polymer; and
   b) said method further comprising a step of polymerizing said monomers such that said particles are covalently coated by said polymer.

49. The method of claim 19 wherein said covalently-coated particles contain a surface functional group selected from the group consisting of amino and carboxy groups.

50. The method of claim 1 wherein said covalently-coated particles contain a surface functional group selected from the group consisting of aromatic, polyaromatic, nitrile, amide, aromatic amine, ester, alcohol, phenol, thiol, imidazole, poly(ethyleneglycol), azide, hydrazide, carbazide, hydrazine, sulfide, disulfide, aldehyde, sulfonate, phosphonate, alkyl halide, protein, nucleic acid, sugar, avidin, and biotin groups.

51. The method of claim 19 further comprising a step of de-airing said coating agent prior to said step of grinding said substrate, for reducing an oxygen concentration in said coating agent.

52. The method of claim 19 wherein said step of isolating said particles comprises a step of washing said particles, for separating said particles from excess unbound coating agent.

53. The method of claim 48 wherein the polymerization is initiated at the surface of the particle by reactive species created by said grinding.

* * * * *